Dec. 18, 1928.  H. B. BANKS  1,695,409
BABY CAB
Filed Sept. 3, 1927
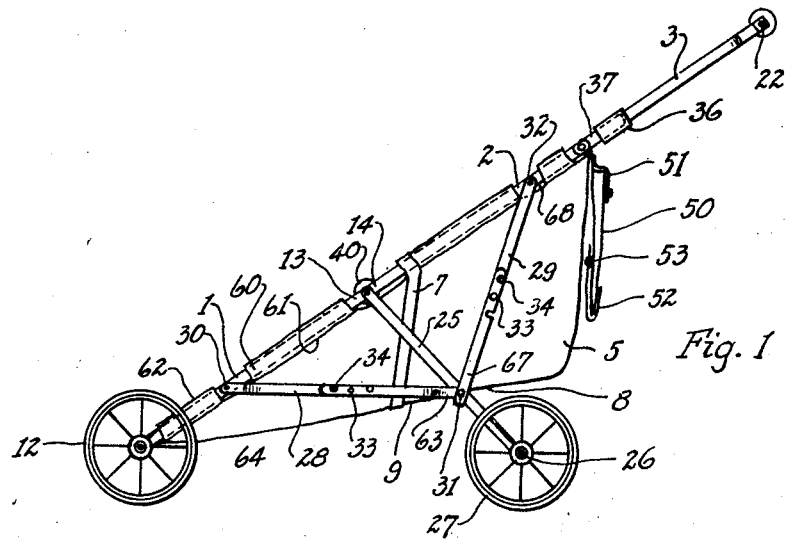
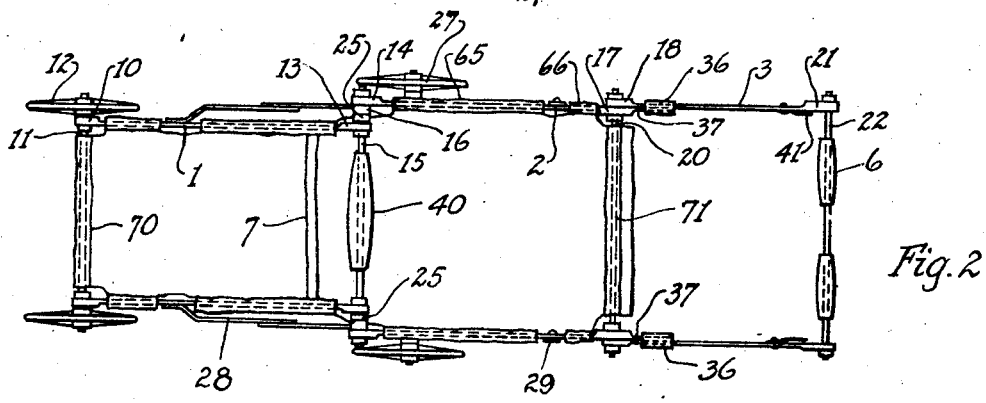
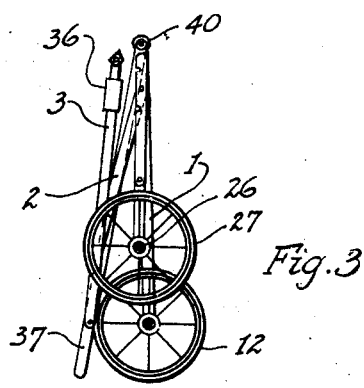
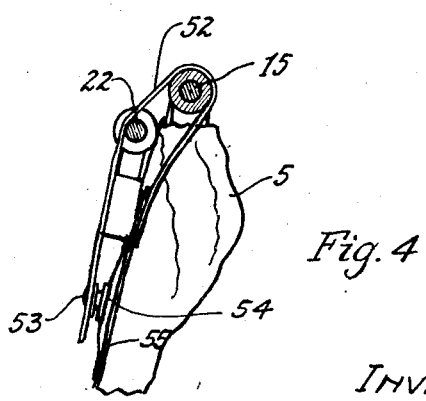
INVENTOR:
Herbert B. Banks
By E. J. Andrews
Atty.

Patented Dec. 18, 1928.

1,695,409

UNITED STATES PATENT OFFICE.

HERBERT B. BANKS, OF CHICAGO, ILLINOIS.

BABY CAB.

Application filed September 3, 1927. Serial No. 217,475.

This invention relates to folding baby carriages and it has for its objects the provision of a baby carriage that will be light enough to be conveniently carried around with one hand and arranged so that it can be folded into compact shape. Another object of the invention is to provide the various supporting and frame members so as to allow the cab to be folded or unfolded very conveniently and quickly with one hand. Other objects of the invention will be apparent from a consideration of the accompanying drawings and the following description thereof.

Fig. 1 is a side elevation of a baby carriage which embodies the features of my invention; Fig. 2 is a plan view of the same; Fig. 3 is a side elevation of the carriage when folded, but with the flexible fabric omitted; Fig. 4 is an enlarged sectional view of the upper end of the folded carriage.

In providing the folding carriage my aim has been to provide a suitable hammock support for the child. For this purpose I provide a sheet 5 of flexible fabric, preferably canvas, fastened by all of its edges to a suitable frame, so that the central portion of the canvas will sag down to form a seat or bed for the child. In this way not only is the canvas more firmly held, but the sides prevent the baby from reaching or falling out, and the length is sufficient to allow it to lie down if necessary. As it is desired to have the baby sit up or lie down as desired, my object has been to provide a suitable seat which will not interfere with the lying down of the baby. For this purpose I provide a strip 7 preferably of canvas, which extends entirely around the canvas 5 and materially strengthens and stiffens the canvas where the strip 7 is placed, the strip preferably being sewed to the canvas. When the child sits down the portion 8 of the canvas yields materially more than the portions 9, which is supported by the strip 7 and thus forms a comfortable seat for the baby and prevents its slipping downwardly. But when the baby is lying down the weight is largely on the strip 7 or below this strip, and hence the portion 8 is amply strong enough to hold the head of the child up sufficiently to prevent discomfort.

The frame of the carriage comprises the double jointed side bars 1, 2, and 3. The bars 3 have handles 6. The bar 3 on each side has the end 10 as a bearing for the axle 11, which supports the front wheels 12. The upper ends 13 of the bars 1 are pivoted to the ends 14 of the bars 2 by means of a cross bar 15, and, preferably, the two bar ends are spaced by sleeves 16, which thus throw the central side members 2 farther apart and provide more room for the baby. The upper ends 17 of the central bars are pivoted to the lower ends 18 of the handle bars 3 by means of a cross rod 20 and the upper ends 21 of the handle bars are connected by means of a cross rod 22. Pivoted also to the ends 13 and 14 on each side of the frame is a wheel bar 25, the lower ends of which support the rear axle 26 of the rear wheels 27. Brace bars 28 and 29 are provided to allow folding of the frame, but normally to suitably support the bars 25. Each side bar 28 is pivoted to the respective side bar 1 at a suitable point 30 and to the bar 25 at a suitable point 31. While the bar 29 is pivoted to the central side bar 2 at a point 32 and is also pivoted to the bar 25 at the point 31. Each of these supporting bars 28 and 29 are jointed, consisting of two bars pivoted at the point 33, and with any suitable locking means such as the pin 34. The handle bars 3 are locked in their operating position by means of sleeves 36 which slide freely on the bars 3 and are of sufficient size to pass over the projecting ends 37 of the central side frame bars 2.

In folding the cab it is necessary only to fold the bars 3 over on the bars 2 and to break the joints 33 by pushing the pivoted ends of the bars 28 out of line, in an ordinary manner. By grasping the bar 25 by the handle 40 the bars 1 and 2 will double up and the various side and supporting bars will fold into the position indicated in Fig. 3, but with the handle bars 3 projecting. To fold the handle bars 3 it is necessary only to slip the sleeves 36 free from the projections 37. In order to hold the sleeves from interference when folding the bars 3 the sleeves may be slipped to the outer end of these bars and held in place by means of springs 41. The bars 3 may then be folded downwardly with reference to the central side bars 2 but extending upwardly when the carriage is standing in its upright position, as shown in Fig. 3. In order to allow the carriage to so stand the projections 37 are made of such length as to form supporting legs for the carriage in conjunction with the forward wheels 12.

It will thus be seen that the carriage may be very conveniently folded, even with the baby held on one arm, as it is necessary only to slip the sleeves 36 to the upper positions, supported by the springs 41, turn the handle bars 3 downwardly against the central bars, break the joints 33, and grasp the handle 40. The weight of the mechanism, if necessary aided by a little shaking, will cause the various bars to fold up as indicated in Fig. 3.

In order to allow the fastener 53 to be conveniently operated with one hand the element 54 of the fastener which is connected to the bag is fixed to a piece 55 which is so connected to the bag that the fingers can be slipped between the fastener and the bag. Preferably the entire frame, except for the connecting means and axles, is made of aluminum.

An accessory is provided for in the shape of a bag 50 for holding whatever may be desired. This bag is suspended by the rod 20 and preferably hangs outside of the canvas 5 and has a lap 51 for closing the upper end. When the carriage is folded the bag is turned over on to the side of the frame and a strap 52, fixed to the lower edge of the bag, is turned over the rods 15 and 22 and is fastened by a snap fastener 53 to the side of the bag. This arrangement holds the frame in its folded position so that it may be conveniently carried by means of the handle 40. The strap 52 is fastened to the bag fastener 53 as indicated in Fig. 1, when the carriage is unfolded.

I claim as my invention:

1. A folding carriage comprising a pair of double jointed side bars, a front axle connecting one pair of adjacent ends of said bars, a handle rod connecting the other ends of said bars, a wheel bar pivoted to a joint of each side bar and normally extending angularly therefrom, an axle connecting the outer end of each wheel bar, a wheel mounted on each end of each of said axles, a pair of jointed spaced supporting bars pivoted to each side bar and to the wheel bar, a second rod connecting said side bars between said handle rod and said front axle, and a flexible fabric sheet depending from and supported only by said front axle, said second rod, and said side bars.

2. A carriage as claimed in claim 1 in which one of each pair of supporting bars is pivoted to the respective side bar between two joints, and the other is pivoted to said side bar between the axle end thereof and the adjacent joint.

3. A carriage as claimed in claim 1 in which a cross rod is connected to the joint of each side bar to which said wheel bar is connected, and a carrying handle fixed to said last mentioned rod.

4. A folding carriage comprising a pair of double jointed side bars, a front rod connecting one pair of adjacent ends of said bars, a handle rod connecting the other ends of said bars, a wheel bar pivoted to a joint of each side bar and normally extending angularly therefrom, an axle connecting the outer end of each wheel bar, a wheel mounted on each end of said axle, a pair of jointed spaced supporting bars pivoted to each side bar and to the wheel bar, a second rod connecting said side bars between said handle rod and said front rod, and a flexible fabric sheet depending from and supported by said front rod, said second rod and said side bars.

In testimony whereof, I hereunto set my hand.

HERBERT B. BANKS.